United States Patent [19]

Kuether

[11] 4,361,360
[45] Nov. 30, 1982

[54] TUBE END FORGING PROCESS

[75] Inventor: Siegfried Kuether, 1199 Front Rd., La Salle, Ontario, Canada

[73] Assignee: Siegfried Kuether, Rochester, Mich.

[21] Appl. No.: 17,502

[22] Filed: Mar. 5, 1979

[51] Int. Cl.³ .............................................. B60B 35/08
[52] U.S. Cl. ...................................... 301/127; 72/367; 228/60
[58] Field of Search ........................... 301/127, 124 R; 280/96.1; 267/52; 29/150, 422; 72/377, 69, 367; 228/60

[56] References Cited

U.S. PATENT DOCUMENTS

| | | | |
|---|---|---|---|
| 1,762,407 | 6/1930 | Mogford et al. | 301/124 R X |
| 1,873,453 | 8/1932 | Mogford et al. | 228/159 X |
| 2,007,793 | 7/1935 | Crawford | 301/124 R |
| 2,141,753 | 12/1938 | Hufferd et al. | 72/377 X |
| 2,313,474 | 3/1943 | Hill | 72/69 |
| 2,408,596 | 10/1946 | Bednar et al. | 72/69 |
| 2,733,503 | 2/1956 | Beringer et al. | 72/377 X |
| 2,911,262 | 11/1959 | Franck | 301/124 R |
| 3,804,467 | 4/1974 | Austermann | 301/127 |

Primary Examiner—David M. Mitchell
Attorney, Agent, or Firm—Reising, Ethington, Barnard, Perry & Brooks

[57] ABSTRACT

A unitary tubular axle (12) is formed to include an end (18) having a support section (22) of a completely solid cross section located between a generally vertical kingpin bore (24) and a tubular intermediate portion (16) of the axle. Both ends (18) of the tube are formed with such an end construction to provide a unitary front axle for both wheels. Forming proceeds by initially reducing the size of the outer tube diameter at an end thereof while maintaining roundness. Axial forging of the tube end preferably by a closed die having a semispherical closed end then provides an axle end having a solid cross section and a distal semispherical shape. Subsequent axial forging of the solid tube end by another closed die then provides upper and lower projections (26, 28) in which upwardly and downwardly facing holes are then forged to increase the width thereof while leaving a web between inner ends of the holes. A final boring operation through the upper and lower projections along the respective holes thereof and through the web then provides the kingpin bore which is located on the opposite side of the solid support section from the intermediate tubular portion of the axle. Bending of the axle end provides an upawardly extending wing section (20) from which the solid support section projects generally horizontally.

3 Claims, 14 Drawing Figures

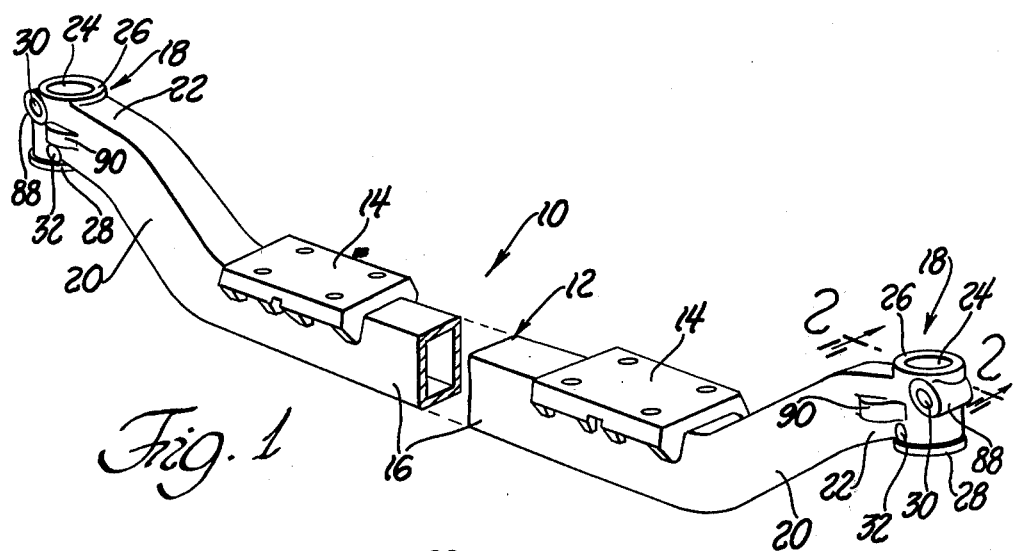
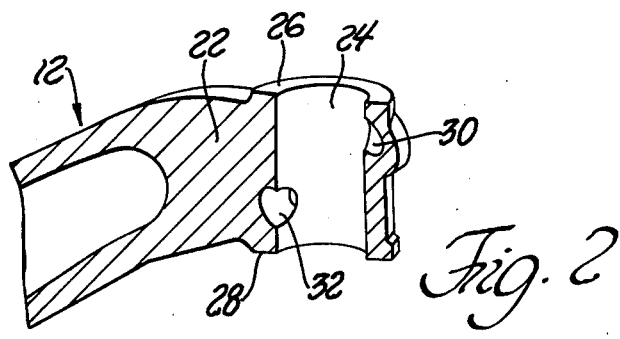
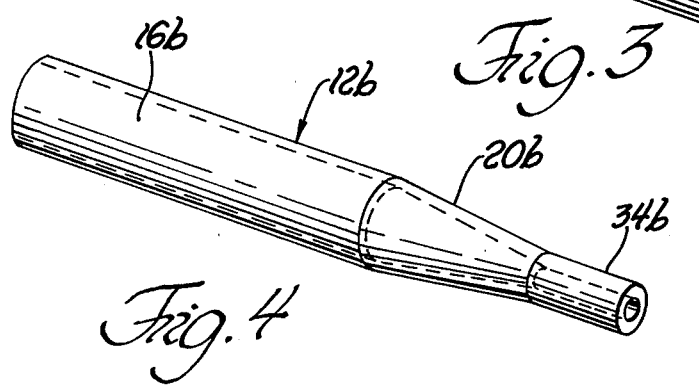

TUBE END FORGING PROCESS

TECHNICAL FIELD

This invention relates to a unitary tubular axle including a solid end construction and also relates to a process for making the axle end from a round tube.

BACKGROUND ART

U.S. Pat. No. 3,804,467, which is assigned to the assignee of the present invention, discloses a vehicle axle that is formed from a round tube by a forging process to define an end of a rectangular cross section. Forging of the tube end to form the axle is performed during successive steps at which the tube wall is simultaneously as well as shaped so that its outer surface is formed into the generally rectangular cross section. Such forging results in an axle end having a center void. After forging of the axle end, a generally vertical kingpin bore is machined through the axle end in order to provide for mounting of a kingpin used to support a wheel spindle on the axle. This kingpin bore extends through the void region of the forged axle end.

DISCLOSURE OF INVENTION

One object of the present invention is to provide a unitary axle having an improved solid end construction, and another object of the invention is to provide a process for forming such an axle end from a round tube.

A tubular axle constructed according to the present invention includes an intermediate axle portion of a hollow tubular construction and at least one end that projects from the intermediate axle portion and includes a generally vertical kingpin bore and a support section of a solid cross section located between the vertically extending kingpin bore and the intermediate axle portion so as to provide a high strength axle end for supporting a wheel. In the preferred embodiment disclosed, both ends of the tube are forged to include the axle end construction in order to provide a vehicle axle on which two wheels are mounted. However, it should be understood that it is also possible to form the axle end construction of the invention on only one end of the axle whose other end is mounted on the vehicle such that a pair of the axles cooperate with each other to provide the support for the two wheels.

The preferred axle end construction includes upper and lower projections through which the kingpin bore extends. These projections increase the vertical height of the bore so as to thereby reinforce a mounted kingpin against bending forces applied to it by a wheel during use. Between axial forging steps of the process for making the solid axle end, the axle tube is bent to provide a wing section of a hollow construction that extends upwardly and horizontally from the intermediate axle portion with the solid support section extending from the wing section in a generally horizontal direction. Both the intermediate axle portion and the wing section are formed between the axial forging steps to provide a desired outer tube shape for carrying the axle load.

Forming of the axle is performed by initially reducing the outer size of a round tube end while maintaining the tube roundness. Subsequent axial forging of the tube end provides an axle end having a completely solid cross section in which there are no voids or hollow regions. Forging of the solid axle end is performed by a closed die which preferably has an opening with a semispherical closed end such that the forged axle end has a solid cross section with a distal semispherical shape. Axial forging of the solid axle end by another closed die then provides the upper and lower projections that are located in a distal direction from the rest of the solid axle end which provides the solid support section. Upwardly and downwardly facing holes are then simultaneously forged in the upper and lower projections while concomitantly increasing the transverse width of the axle end adjacent the holes and leaving a web between their inner ends. Boring by a machining operation is then performed through the upper and lower projections along the respective holes thereof and through the web therebetween to provide the vertical bore for mounting a kingpin on the axle end.

A high strength axle end for mounting a kingpin within the bore thereof is provided by virtue of the solid support section located between the kingpin bore and the intermediate axle portion. The forming of the outer tube shape along the intermediate axle portion and the upwardly bent wing section of each axle end also enhances the axle strength.

The objects, features, and advantages of the present invention are readily apparent from the following detailed description of the best mode for carrying out the invention when taken in connection with the accompanying drawings.

BRIEF DESCRIPTION OF DRAWINGS

FIG. 1 is a perspective view showing an axle constructed in accordance with the present invention;

FIG. 2 is a sectional view taken along line 2—2 of FIG. 1 through a solid end of the axle;

FIG. 3 is a partial view of a round tube from which the axle is formed;

FIG. 4 is a partial view of the tube end after the outer diameter thereof has been reduced during initial forming of the axle end;

BEST MODE FOR CARRYING OUT THE INVENTION

Figure 5:
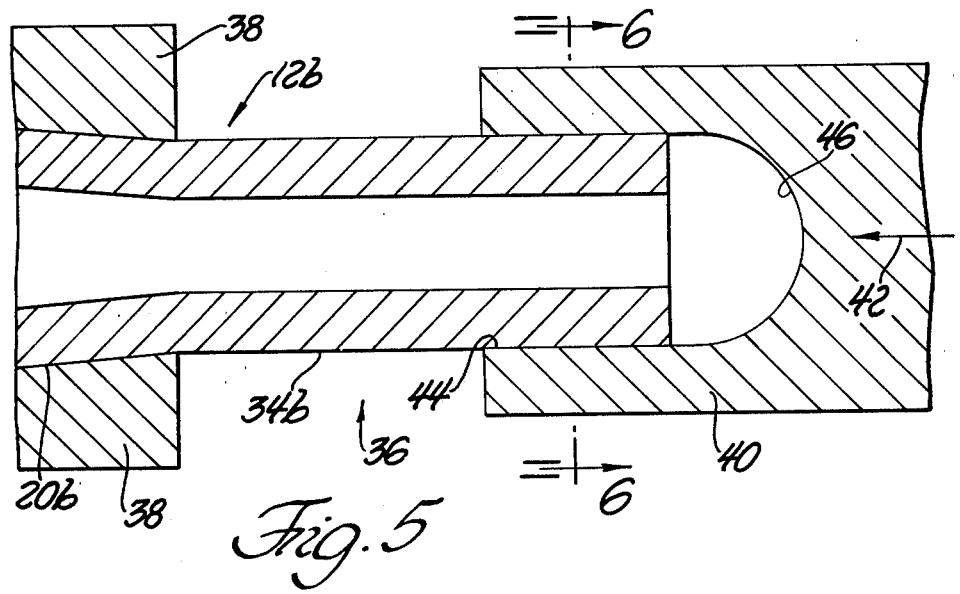
FIG. 5 is a longitudinal sectional view through a forging die set and the reduced tube end which is forged thereby to provide a solid axle end.

Referring to FIG. 1 of the drawings, a front axle assembly collectively indicated by reference numeral 10 includes a tubular axle 12 that is constructed in accordance with the present invention and also includes a pair of mounts 14 that are welded or otherwise suitably secured to the axle in order to provide mounting thereof on a vehicle. Axle 12 includes a tubular intermediate portion 16 and a pair of forged axle ends 18 for supporting associated kingpins to respectively mount a pair of wheel spindles. It should be understood that the invention is also applicable to a tubular axle having one end that is mounted on a vehicle and another end which supports a single kingpin such that two of the axles would be required for use with each other to replace the single axle illustrated.

As seen by additional reference to FIG. 2, each axle end 18 includes a hollow wing section 20 that is bent upwardly from the adjacent end of the intermediate axle portion 16. A support section 22 of the axle end 18 has a completely solid cross section and projects horizontally from the wing section 20. In a distal direction from the support section 22, the axle end 18 includes a generally vertical kingpin bore 24 for mounting a kingpin that is used to support a wheel spindle. Thus, the solid support section 22 is located between the intermediate axle portion 16 and the kingpin bore 24 in order to provide a high strength axle construction for supporting a kingpin received by the bore. Of course, the orientation of the kingpin bore may be inclined with respect to the vertical in a conventional fashion so that the kingpin axis passes through the location of tire engagement with the ground in order to reduce turning effort. It should also be noted that the kingpin bore 24 extends through upper and lower projections 26 and 28 that extend vertically from the solid support section 22 in order to enhance the support provided to the kingpin in carrying bending forces applied thereto by the wheel spindle. A seal of the kingpin engages the finished upwardly facing surface of the upper projection 26 while a thrust bearing for carrying the vertical load of the wheel spindle engages a finished downwardly facing surface of the lower projection 28. A pair of upper and lower cross bores 30 and 32 through the axle end merge with the kingpin bore 24 to provide locking of the kingpin against axial movement.

Forming of the axle illustrated in FIGS. 1 and 2 is performed by starting with a round tube 12a as illustrated in FIG. 3. The end of the tube is heated to a forging temperature and then forced through a tapered die opening having a frustoconical surface so as to initially reduce the size of the outer tube diameter at its end while maintaining the tube roundness. After such forming, the axle tube has the configuration as shown in FIG. 4 and identified by reference numeral 12b. The axle tube 12b has an intermediate tube portion 16b from which a frustoconical tube portion 20b extends to ultimately form the axle wing section as is hereinafter described. Axle tube 12b also has a tubular end 34b that projects from the smaller end of the frustoconical tube portion 20b and has a wall thickness that is greater than the wall thickness of the intermediate tube portion 16b. The wall thickness of the frustoconical tube portion 20b increases continuously in a longitudinal direction from the lesser thickness of the tube portion 16b to the greater thickness of the tube end 34b.

Figure 6:
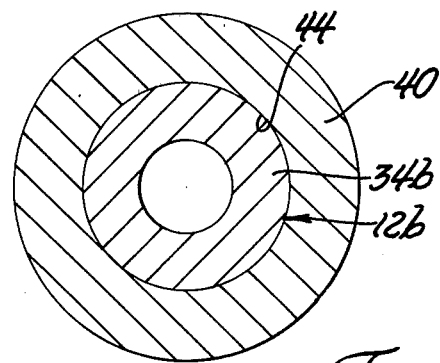
FIG. 6 is a cross sectional view taken along line 6—6 of FIG. 5 through the reduced tube end and a closed die of the forging die set prior to forging of the solid axle end.

The axle tube end 34b shown in FIG. 4 is then heated to facilitate a forging operation which is performed by a forging die set 36 illustrated in FIG. 5. A pair of split dies 38 of the die set grip the axle tube 12b at the frustoconical portion 20b thereof while a closed die 40 of the die set is moved along the direction of arrow 42 during a forging stroke. Die 40 has a round opening 44, see also FIG. 6, that receives the tube end 34b as the closed die is moved along the direction of arrow 42. Die opening 44 has a semispherical inner end 46 which forms the tube end 34b as the closed die 40 impacts the tube upon movement to the left.

Figure 7:
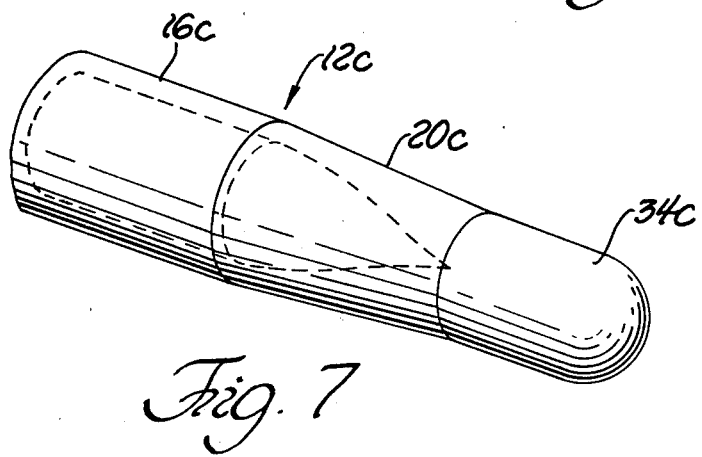
FIG. 7 is a perspective view of the solid axle end that is forged by the forging dies illustrated in FIGS. 5 and 6.

After the forging step described in the preceding paragraph, the axle tube has the construction illustrated in FIG. 7 and identified by reference numeral 12c. Tube end 34c which is forged by the die set 36 as previously described has a solid cross section with a distal semispherical shape opposite its juncture with the frustoconical tube portion 20c. While the wall thickness of the intermediate axle tube portion 16c remains generally the same as the initial tube wall thickness, the wall thickness of the axle tube portion 20c increases continuously moving a distal direction toward the solid tube end 34c as a result of the spacing between its outer frustoconical surface and its inner surface which has a pointed shape of a round cross section.

Figure 8:
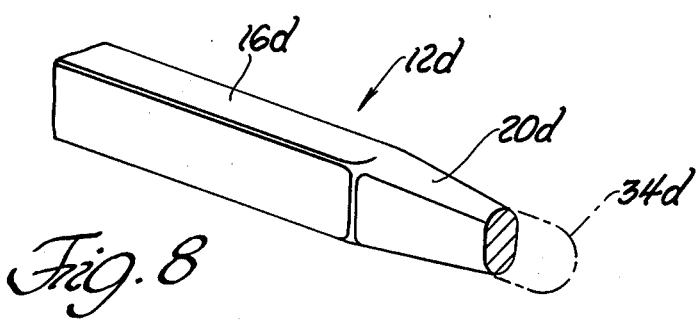
FIG. 8 is a perspective view of the forged axle end whose outer shape has been formed to a desired shape for carrying the axle load at both the intermediate axle portion and the axle end.

With reference to FIG. 8, any conventional forging type process may then be performed to form the outer shape of the axle tube to a desired configuration such as identified by 12d, in order to enhance the strength of the axle. As shown, the intermediate axle portion 16d has a square cross section of a hollow construction and the tapered axle portion 20d likewise has a square cross section of a hollow construction inwardly from the solid axle end 34d. Solid axle end 34d is also formed so that its sides are flattened to provide an oblong shape with rounded upper and lower ends. Axle tube 12d is subsequently bent so as to have the shape shown in FIG. 9 and identified by reference numeral 12e with the upwardly bent wing section 20e from which the solid axle end 34e projects horizontally.

Figure 9:
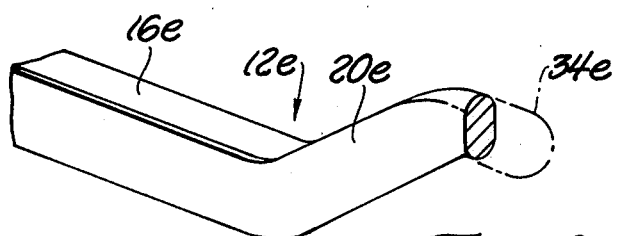
FIG. 9 is a view similar to FIG. 8 illustrating the axle end after bending thereof to provide an upwardly extending wing section from which the solid axle end projects horizontally.
Figure 10:
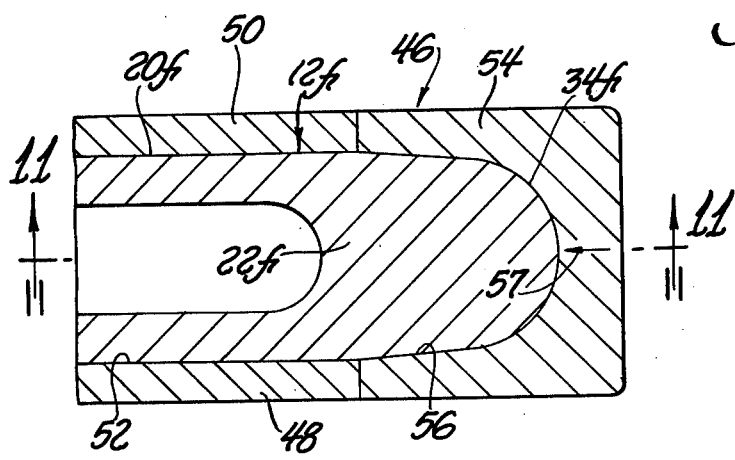
FIG. 10 is a longitudinal sectional view through a forging die set utilized to forge the axle shown in FIG. 9 so that its solid end includes upper and lower projections.
Figure 11:
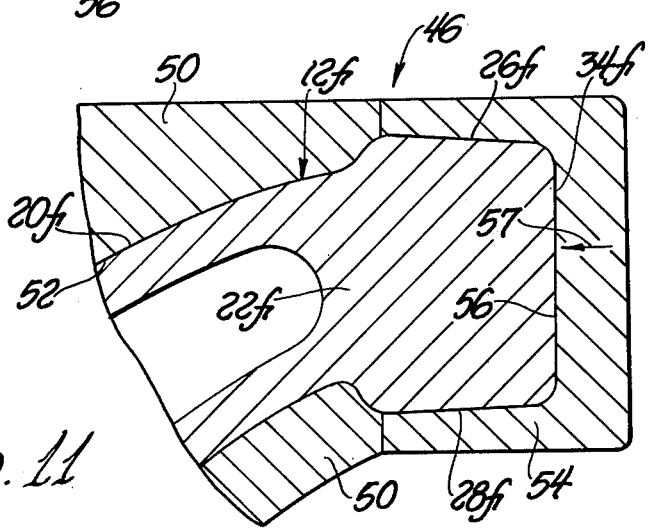
FIG. 11 is taken along line 11—11 of FIG. 10 through the forging die set and the upper and lower projections that are forged on the solid axle end.

Axle tube 20e shown in FIG. 9 is heated and then forged by a die set collectively indicated by 46 in FIGS. 10 and 11 so as to provide the axle tube 12f that is shown in the latter views. Die set 46 includes a pair of split dies 48 and 50 shown in FIG. 10 that cooperatively define a cavity 52 for gripping the heated axle portion to forging thereof by a closed die 54 of the die set 46. An opening 56 of the closed die 54 receives the solid end of the axle tube as the closed die is moved in the direction of arrow 57 during a forging stroke in order to form the upper and lower projections 26f and 28f (FIG. 11) that project upwardly and downwardly from the solid support section 22f located toward the intermediate axle portion from the solid axle end 34f.

Figure 12:
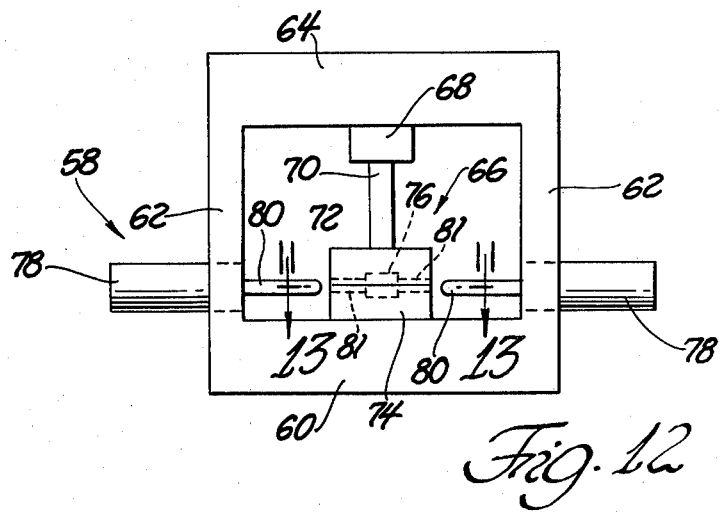
FIG. 12 is an elevation view of forging die apparatus for completing the forging of the axle end.
Figure 13:
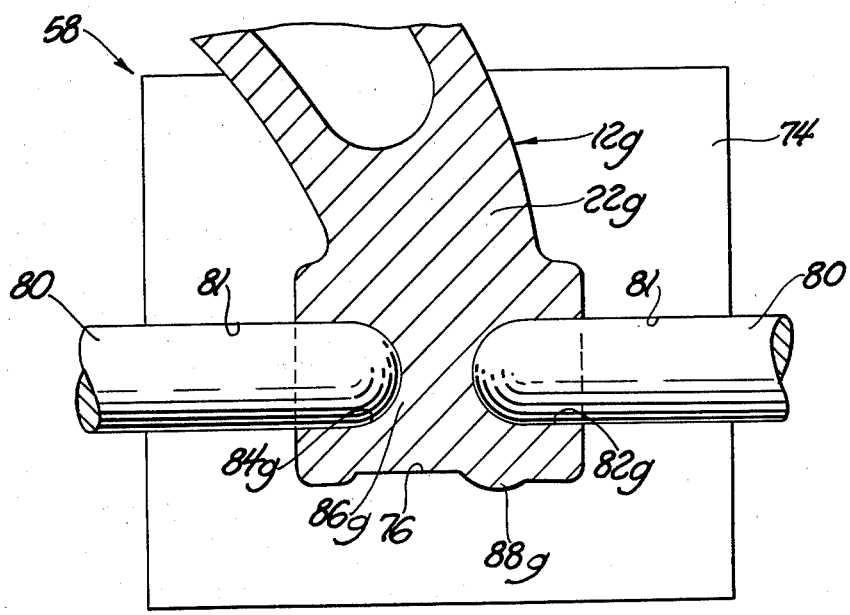
FIG. 13 is a plan view taken partially in section along line 13—13 of FIG. 12 and illustrates the manner in which oppositely facing holes are forged in the axle end projections while leaving a web therebetween.
Figure 14:
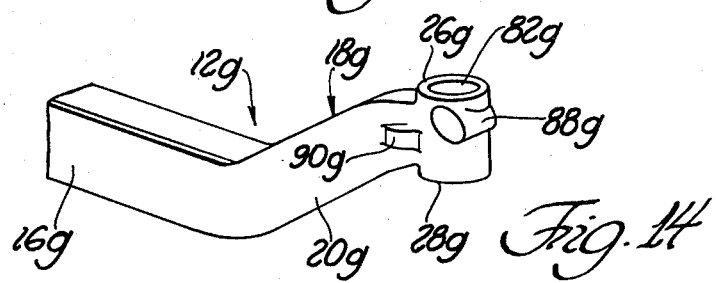
FIG. 14 is a perspective view of the forged axle end prior to a machining operation that completes the axle making process.

After the forging previously described, the tubular axle is then formed by forging apparatus 58 illustrated in FIGS. 12 and 13 to provide the axle tube 12g illustrated in FIG. 14. As seen in FIG. 12, the apparatus 58 includes a floor mounted base 60 and upwardly extending supports 62 that are connected by an upper base 64 to cooperatively define a work space 66. A hydraulic cylinder 68 mounted on the upper base 64 has a piston connecting rod 70 that is moved downwardly to position a first split die 72 of the forging apparatus against a split die 74 mounted on the floor base 60 within the work space 66. Split dies 72 and 74 cooperate to define a cavity 76 in which the axle tube end formed by the previous steps is clamped after first being heated to a forging temperature. A pair of cylinders 78 mounted on the spaced supports 62 have respective punches 80 that are aligned with round passages 81 formed at the interfaces of the split dies 72 and 74 in communication with the cavity 76. Punches 80 are simultaneously moved inwardly by the cylinders 78 into openings 81 to forge the axle end shown in FIG. 13 with oppositely facing holes 82g and 84g that respectively open upwardly and downwardly with the axle 12g oriented in its use position shown in FIG. 14. The transverse width of the axle end adjacent the holes 82g and 84g is increased during the forging by the punches 80 whose movement terminates short of each other so that a web 86g is left between the holes. Movement of the axle end material during this forging step also provides a cross bore lug 88g through which the upper cross bore 30 shown in FIGS. 1 and 2 is subsequently machined and the material flow also provides a stengthening lug 90g. Excess material flows toward the intermediate portion of the axle tube 12g to increase the horizontal extent of the solid support section 22g that strengthens the axle end.

A boring operation is performed on the end of the axle tube 12g shown in FIG. 14 through the upper and lower projections 26g and 28g thereof along the holes 82g and 84g and through the web 86g in order to provide the kingpin bore 24 illustrated in FIGS. 1 and 2. Likewise, boring operations are performed to define the upper and lower cross bores 30 and 32 that receive the pins for locking the kingpin in position. Similarly, the upper and lower vertical surfaces of the axle end projections 26g and 28g shown in FIG. 14 are machined by any suitable machining operation to provide the seal and thrust bearing surfaces.

It should be noted that the hot forging steps described are preferred in order to limit the impact force required to form the axle during each step. However, warm or cold forging can also be used if greater impact force is applied during each step.

While a preferred embodiment of the tubular axle and the process for making the axle have herein been described in detail, those familiar with the art will recognize various alternative constructions and ways for practicing the invention as defined by the following claims.

What is claimed is:

1. A process for making a solid end tube from a tube with a hollow end of a round shape, the process comprising: moving a closed die having a round opening including a semispherical inner end in a rectilinear path without rotation toward the hollow tube end to axially forge said tube end within the die opening to a solid condition while maintaining the roundness thereof and concomitantly forging a distal semispherical shape.

2. A process for making an axle with a solid end from a round tube with a hollow end, the process comprising: moving a closed die having a round opening including a semispherical inner end in a rectilinear path without rotation toward the hollow tube end to axially forge said tube end within the die opening while maintaining the roundness thereof to provide an axle end having a solid cross section and a distal semispherical shape; thereafter axially forging the solid axle end to include upper and lower projections; and finally forming a generally vertical kingpin bore through the upper and lower projections.

3. A process for making an axle from a round tube, the process comprising: initially reducing the size of the outer tube diameter at an end of the tube while maintaining the roundness thereof; subsequently axially forging said tube end while maintaining the roundness thereof to provide an axle end having a completely solid cross section and a distal semispherical shape; thereafter axially forging the solid axle end to provide upper and lower projections; simultaneously forging upwardly and downwardly facing holes in the upper and lower projections while concomitantly increasing the transverse width thereof and leaving a web therebetween; and finally boring through the upper and lower projections along the respective holes thereof and through the web therebetween to thereby provide a bore for mounting a kingpin on the axle end.

* * * * *